(12) United States Patent
Kobayashi

(10) Patent No.: US 11,941,173 B2
(45) Date of Patent: Mar. 26, 2024

(54) IMAGE DISPLAY SYSTEM

(71) Applicant: TOYOTA JIDOSHA KABUSHIKI KAISHA, Aichi-ken (JP)

(72) Inventor: Hideki Kobayashi, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/991,218

(22) Filed: Nov. 21, 2022

(65) Prior Publication Data
US 2023/0161406 A1    May 25, 2023

(30) Foreign Application Priority Data

Nov. 22, 2021 (JP) .................. 2021-189133

(51) Int. Cl.
| | |
|---|---|
| *G06F 3/01* | (2006.01) |
| *G02B 27/01* | (2006.01) |
| *G06T 7/50* | (2017.01) |
| *G06T 7/60* | (2017.01) |
| *G06T 7/73* | (2017.01) |
| *G09G 3/3208* | (2016.01) |

(52) U.S. Cl.
CPC .......... *G06F 3/013* (2013.01); *G02B 27/017* (2013.01); *G06F 3/012* (2013.01); *G06T 7/50* (2017.01); *G06T 7/60* (2013.01); *G06T 7/73* (2017.01); *G06T 2207/30204* (2013.01); *G06T 2207/30244* (2013.01); *G09G 3/3208* (2013.01); *G09G 2340/0464* (2013.01); *G09G 2354/00* (2013.01)

(58) Field of Classification Search
CPC .... G06T 7/50; G06T 7/73; G06T 7/60; G06T 2207/30204; G06F 3/013; G06F 3/012; G02B 27/017; G09G 3/3208
See application file for complete search history.

(56) References Cited

U.S. PATENT DOCUMENTS

| | | | |
|---|---|---|---|
| 2012/0139816 A1* | 6/2012 | King | B60Q 9/00 340/425.5 |
| 2016/0023602 A1* | 1/2016 | Krishnan | G02B 27/017 348/115 |
| 2021/0118192 A1 | 4/2021 | Sato et al. | |

FOREIGN PATENT DOCUMENTS

| | | |
|---|---|---|
| JP | 2017129406 A | 7/2017 |
| JP | 2019217790 A | 12/2019 |
| JP | 202164906 A | 4/2021 |

* cited by examiner

*Primary Examiner* — Abbas I Abdulselam
(74) *Attorney, Agent, or Firm* — HAUPTMAN HAM, LLP

(57) ABSTRACT

A marker projector mounted on a vehicle forms a marker image on a forward road surface. A camera mounted on a wearable device, which is worn by a driver, captures an image of a landscape including the marker image. A device position and attitude sensor detects a position and an attitude of the wearable device based on a position of the marker image. The image processor determines a display position of the image on a display unit based on the detected position and attitude of the wearable device.

4 Claims, 5 Drawing Sheets

IMAGE DISPLAY SYSTEM

CROSS REFERENCE TO RELATED APPLICATION

This application claims priority to Japanese Patent Application No. 2021-189133 filed on Nov. 22, 2021, which is incorporated herein by reference in its entirety including the specification, claims, drawings, and abstract.

TECHNICAL FIELD

The present disclosure relates to an image display system for providing an occupant of a vehicle with an augmented landscape which is displayed by superimposing an image on an actual landscape viewed by the occupant.

BACKGROUND

A technique for providing an augmented landscape to an occupant of a vehicle has been known; the technique in which a display unit of a wearable device, which is worn like a pair of glasses or goggles by the occupant, displays an image superimposed on an actual landscape viewed through the display unit by the occupant. The image may include, for example, a captured image of an outside area which is located outside a view of the occupant, such as an image captured from an area located behind the vehicle or on a lateral outside thereof, or a virtual image.

Patent publication No. JP 2017-129406 A discloses a technique of virtually displaying a preceding vehicle (AR pacesetter 140) at a position in front of driver's own vehicle. A driver is guided to the destination by operating his/her own vehicle following the preceding vehicle (140). A wearable device (smart glasses 500) worn by the driver incorporates a camera (515), detects a stationary object, such as a front window (100) based on an image captured by the camera (515), and determines a display position of the preceding vehicle (140) and other parameters based on a position of the preceding vehicle (140). It should be noted that component names and reference numerals within parentheses are of the above-described patent publication, and are not associated with component names and reference numerals used in the description about embodiments of this application.

When an image is superimposed on a landscape outside a vehicle, it is desirable to acquire information on a position and an attitude of a wearable device relative to an object existing outside the vehicle. However, because a wide variety of objects are present outside the vehicle, a load of computation for recognizing the objects located outside the vehicle is great. Further, in some cases, images of the objects located outside the vehicle may not be obtained, depending on external environments. For example, undesirable factors, such as deficiency of an amount of light or halation created by severe back-light, may render the objects unrecognizable.

The present disclosure relates to acquisition of a feature point associated with an object located outside a vehicle that is used as a reference against which a position and an attitude of a wearable device are defined, and is directed to providing at least one of advantageous effects of reducing a load of arithmetic operation to recognize the outside object and being impervious to influence of external environments.

SUMMARY

An image display system according to this disclosure includes a wearable device which is worn by an occupant of a vehicle and is equipped with a display unit configured to display an image within a view of the occupant and a wearable camera, a marker projector which is mounted on the vehicle and configured to project a marker on a forward road surface to form a marker image on the forward road surface, a wearable device position and attitude sensor configured to detect a position and an attitude of the wearable device based on the marker image captured by the wearable camera, and an image processor configured to determine a position of the image placed within the view of the occupant on the display unit using the detected position and attitude of the wearable device and operate the display unit to display the image at the determined position.

The image display system according to this disclosure can acquire the marker image even under an adverse environment in which a feature point located outside the vehicle cannot be properly acquired due to deficiency of an amount of light or halation, for example, and accordingly detect a relative position of the wearable device and the forward road surface and the attitude of the wearable device relative to the forward road surface.

Further, a shape of the marker may be a predetermined two-dimensional figure. When the shape of the marker is predetermined, a load of computation to extract the marker image from an image of forward view is reduced.

In addition, the image display system may further include a road surface shape detector configured to detect, based on the position and shape of the marker image, at least either an inclination or unevenness of the road surface. In this case, the predetermined image which is displayed on the road surface can be displayed so as to conform to the road surface.

Moreover, the image display system may further include a pupil position sensor configured to detect a position of a pupil of the occupant relative to the display unit, and the image processor may be further configured to determine the position of the image placed within the view of the occupant on the display unit using, in addition to the detected position and attitude of the wearable device, the detected position of the pupil. This allows the position of the image displayed on the display unit to be fitted to an actual landscape with high accuracy.

According to the present disclosure, the marker image can be acquired under an adverse external environment, such as being in the nighttime or having severe back-light, and the image can be accordingly displayed at an appropriate position on the display. Further, because the shape of the marker is predetermined, the load of computation associated with extraction of the marker image can be reduced.

BRIEF DESCRIPTION OF DRAWINGS

Embodiments of the present disclosure will be described based on the following figures, wherein.

DESCRIPTION OF EMBODIMENTS

Hereinafter, embodiments will be described with reference to the drawings. In the following description, specific embodiments are explained for better understanding. The embodiments are presented by way of illustration, and the present disclosure may be embodied in various other ways.

Figure 1:
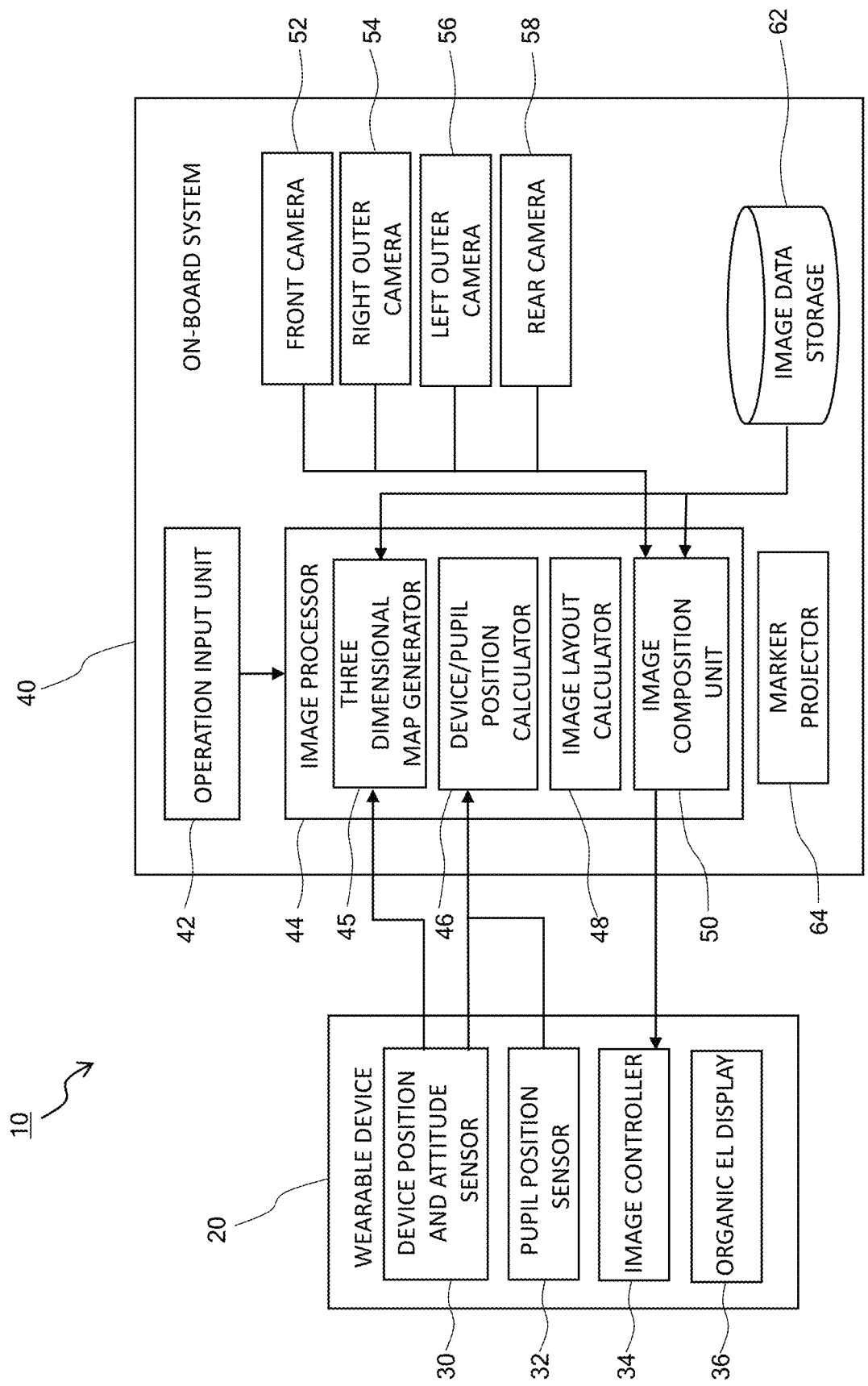
FIG. 1 is a block diagram showing a configuration of an image display system according to an embodiment.

FIG. 1 is a block diagram showing a functional configuration of an image display system 10 according to an embodiment. The image display system 10 includes a wearable device 20 and an on-board system 40.

The wearable device 20 is a device which is worn in a manner similar to spectacles or goggles by an occupant, such as a driver, of a vehicle. The wearable device 20 includes a device position and attitude sensor 30, a pupil position sensor 32, an image controller 34, and an organic electroluminescence (EL) display 36.

Figure 2:
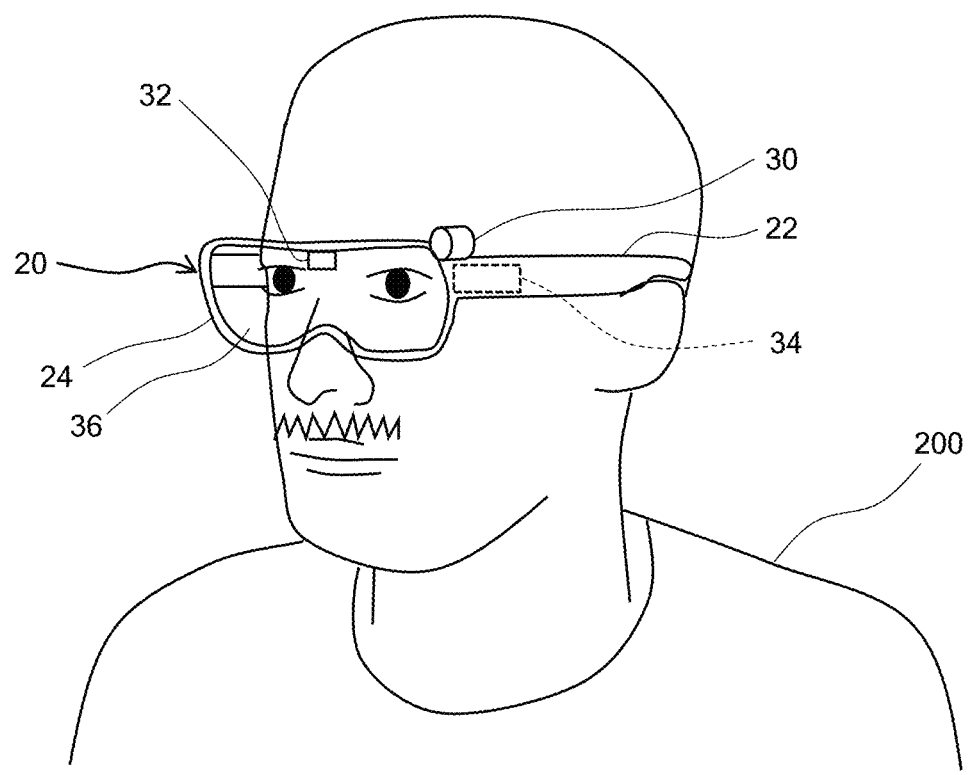
FIG. 2 is an external view of a wearable device worn by a driver.

The wearable device 20 is schematically illustrated in FIG. 2. In FIG. 2, the wearable device 20 is shown in a state where it is worn by a driver 200. The wearable device 20 is a device formed in the shape of spectacles, and may be referred to as smart glasses in some cases. The wearable device 20 includes temples 22 which are linear frame members designed to be put on the ears of a user, and a rim 24 joined to the temples 22, the rim 24 being a frame member designed to surround the eyes of the user and to be put on the nose of the user.

A display unit, in particular, an organic EL (Electro Luminescence) display 36 is arranged within the rim 24. The organic EL display 36, which is positioned so as to cover a region in front of the eyes of the driver 200, has a high degree of transparency (high light transmittance) for allowing the driver 200 to view forward through the organic EL display 36 when no image is displayed thereon. An image may be formed on a part or the whole part of the organic EL display 36 under the control of the image controller 34. When the image is formed on a partial region of the organic EL display 36, an augmented landscape can be presented to the driver 200 by displaying a generated image so as to be overlaid on a landscape which is actually viewed by the driver 200.

The device position and attitude sensor 30 is disposed in the vicinity of a coupling area between the rim 24 and the temple 22 of the wearable device 20. The device position and attitude sensor 30 detects a position and an attitude of the wearable device 20 within the vehicle. Specifically, the device position and attitude sensor 30 detects the position of the wearable device 20 in a rectangular coordinate system which is fixed to the vehicle, and the attitude of the wearable device 20 (i.e., inclinations of the wearable device 20 relative to coordinate axes of the rectangular coordinate system). The device position and attitude sensor 30 can be implemented, for example, using a camera (such as a wearable camera) which is fixed to the wearable device 20 and configured to capture an image of a forward area. Here, a position and an attitude of the camera can be identified by comparing the image captured by the camera with data of a layout of objects, such as parts and devices, existing inside the vehicle. Then, the position and the attitude of the wearable device 20 can be detected through the camera which is fixedly installed on the rim 24 and thus the organic EL display 36 integrated into the rim 24.

The pupil position sensor 32 is disposed on an upper part of the rim 24 in the vicinity of the center of the upper part. The pupil position sensor 32 is configured to detect positions of the pupils in the left and right eyes of the driver 200 relative to the rim 24. The pupil position sensor 32 may be implemented using a camera as in the case of the device position and attitude sensor 30.

The temple 22 internally incorporates the image controller 34. The image controller 34 is configured to display an image on the organic EL display 36 based on data received from the on-board system 40. The wearable device 20 can operate the image controller 34 and the organic EL display 36 to perform image representation and provide the driver 200 with a visual environment that is different from an ordinary environment through the image representation.

Returning to FIG. 1, the on-board system 40 is explained below. The on-board system 40 is a system mounted on the vehicle. The on-board system 40 includes an operation input unit 42, an image processor 44, a front camera 52, a right outer camera 54, a left outer camera 56, a rear camera 58, an image data storage 62, and a marker projector 64. The operation input unit 42 is provided for allowing the driver 200 to operate the image display system 10. The driver 200 can operate the operation input unit 42 to instruct whether or not an image is to be displayed on the wearable device 20, and if displayed, which image is to be displayed on the wearable device 20. Examples for displaying the image will be described further below.

The operation input unit 42 may be composed of buttons which are displayed on a touch panel disposed on an instrument panel, for example. Alternatively, the operation input unit 42 may be composed of mechanical buttons mounted on the instrument panel. Still alternatively, the operation input unit 42 may be provided to the wearable device 20.

The image processor 44 is a device for generating an image which is displayed on the wearable device 20. The image processor 44 may be implemented by controlling computer hardware incorporating a memory, a processor, and other components using software, such as an operating system (OS) and application programs.

The image processor 44 includes a three-dimensional map generator 45, a device/pupil position calculator 46, an image layout calculator 48, and an image composition unit 50. The three-dimensional map generator 45 acquires, from an image of a vehicle forward view obtained from the device position and attitude sensor 30 which is implemented by a camera, feature points of objects including road markings, such as white lines and arrows on a road surface, traffic signs, such as information signs and regulatory signs, and buildings standing along a roadway, and generates a three-dimensional map of the forward view. The device/pupil position calculator 46 calculates a relative position of the wearable device 20 within the vehicle and a relative position of the pupil of the driver 200 based on inputs from the device position and attitude sensor 30 and the pupil position sensor 32 (such as, for example, inputs of images captured by the camera as described above).

For image representation instructed from the operation input unit 42, the image layout calculator 48 performs calculation to find which image is to be displayed at which position on the organic EL display 36; that is, calculation to determine a layout of images to be composed. To determine the layout, the image layout calculator 48 uses previously stored data of relative positions of interior components of the vehicle, and also uses data of the relative position and attitude of the wearable device 20 and the relative position of the pupil calculated in the device/pupil position calculator 46. Using the data, the image layout calculator 48 is able to calculate which position on the organic EL display 36 is intersected by each of lines connecting the pupil of the driver 200 and points on a particular interior component of the vehicle. Then, the image layout calculator 48 calculates at which position a particular image should be displayed on the organic EL display 36 in order to allow the driver 200 to view the particular image overlaid on the particular interior component of the vehicle. In addition, the image layout calculator 48 also calculates a relative position of the wearable device 20 with respect to a position of an outside object existing ahead of the vehicle, the position being defined by the three-dimensional map generator 45, and calculates a display position of the particular image on the organic EL display 36. For example, in a case of a route guiding arrow displayed on the road surface, the image layout calculator 48 calculates at which position the route guiding arrow should be displayed on the organic EL display 36 in order to allow the driver 200 to view the route guiding arrow on the road surface.

The image composition unit 50 performs processing to compose images, for example, stored in the image data storage 62, based on the layout calculated in the image layout calculator 48. For the images to be composed, image data stored in the image data storage 62 are used as needed. Data of the composite images is transmitted to the image controller 34 and the composite images are displayed on the organic EL display 36. Transmission of the composite image data may be performed through wired communication or wireless communication. When wireless communication is employed, short range wireless communication, such as, for example, Bluetooth (registered trademark) communication, Wi-Fi (registered trademark) communication, and infrared communication, may be utilized.

The front camera 52 is a camera for capturing an image of a forward area present ahead of the vehicle. The right outer camera 54 is disposed on a right side of the vehicle to capture an image of a rear area present behind the vehicle on its right side. The left outer camera 56 is disposed on a left side of the vehicle to capture an image of a rear area present behind the vehicle on its left side. The images captured by the right outer camera 54 and the left outer camera 56 are used as images displayed on electronic outer mirrors which can function as substitutes for an optical right outer mirror and an optical left outer mirror. The rear camera 58 is disposed at the widthwise center of the vehicle to capture an image of an area present behind the vehicle. The image captured by the rear camera 58 is used as an image displayed on an electronic inner mirror which can function as a substitute for an optical inner mirror (also referred to as a compartment mirror).

The image data storage 62 is a device which is implemented by means of a semiconductor memory, for example, and is controlled by the image processor 44. The image data storage 62 stores data of images to be displayed on the wearable device 20. The image data stored in the image data storage 62 include image data indicative of outer appearances of vehicle interior components. Specifically, the data may include data indicative of outer appearances of interior components, such as a door trim panel, a seat, and a roof ceiling, data indicative of mirror components, such as the electronic outer mirror, and the electronic inner mirror, and data indicative of guidance signs to be displayed within a forward view of the driver 200.

Figure 3:
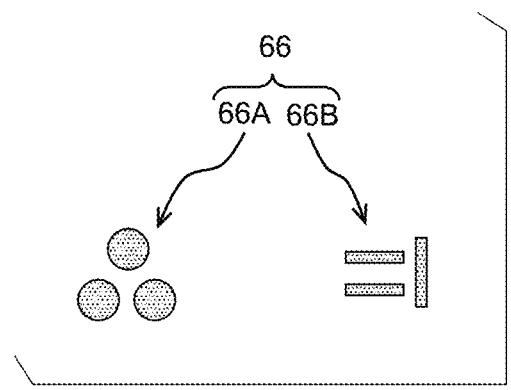
FIG. 3 is a diagram showing a shape of a marker.

The marker projector 64 projects a marker 66 having a predetermined shape shown in FIG. 3 onto an area located ahead of the vehicle, in particular, onto a forward road surface using white light or light having a predetermined wavelength. The marker projector 64 may be incorporated into a head lamp. FIG. 3 shows an example of the shape of the marker 66. In this embodiment, the marker 66 includes a marker 66A composed of three circles arranged at apexes of a triangle and a marker 66B composed of a combination of two lateral line segments and one vertical line segment disposed beside the two lateral line segments. The marker 66A may be projected from one of right and left head lights, and the marker 66B may be projected from the other of the right and left head lights. A marker image is formed on the road surface by projecting the marker 66, and the marker image is employed as a feature point which is used in creation of a three-dimensional map of an outside area. The shape of the marker 66 is stored in the image data storage 62, and is retrieved into the three-dimensional map generator 45 and used therein when the three-dimensional map is created.

The on-board system 40 performs real time processing. Specifically, the on-board system 40 acquires detection data from the device position and attitude sensor 30 and the pupil position sensor 32 in the wearable device 20 at extremely short time intervals. The device/pupil position calculator 46 swiftly calculates, based on the acquired detection data, the position and attitude of the wearable device 20 and the position of the pupils. Then, the image layout calculator 48 calculates the layout of images instructed from the operation input unit 42. The image composition unit 50 combines the images received from the image data storage 62 based on the calculated layout to generate a composite image, and transmits the composite image to the wearable device 20.

In the wearable device 20, the received composite image is processed in the image controller 34, and displayed on the organic EL display 36. Because all processes to achieve image representation are performed at high speed, it is possible to perform processing to rapidly follow motions of the driver 200, such as, for example, processing to follow the driver 200 when they shake their head. Therefore, the driver 200 who wears the wearable device 20 can feel as if a vehicle compartment is actually present, the vehicle compartment being viewed through the wearable device 20 displaying the composite image that is different from reality. Further, the driver 200 is able to feel that an image displayed in a forward view of the driver 200 is a part of an actual landscape in front of the vehicle.

It should be noted that the wearable device 20 has been described with reference to the example wearable device including the image controller 34 and the organic EL display 36, while the wearable device 20 may be implemented based on another principle. For example, the wearable device 20 may be embodied in a form incorporating a projector which projects an image onto the retina of the eye. Meanwhile, the wearable device 20 may be of a type which does not involve visible rays of light, and displays images captured by a camera.

The system configuration in FIG. 1 is illustrated by way of example, and may be modified as appropriate. For example, a part of the configuration of the on-board system 40, such as, for example, the operation input unit 42, the image processor 44, and the image data storage 62 may be mounted on the wearable device 20. In this case, as the image data stored in the image data storage 62, data of images corresponding to the vehicle used by the occupant who wears the wearable device 20 (such as, for example, data of images of each vehicle model) may be acquired through the Internet and stored by the occupant.

Figure 4:
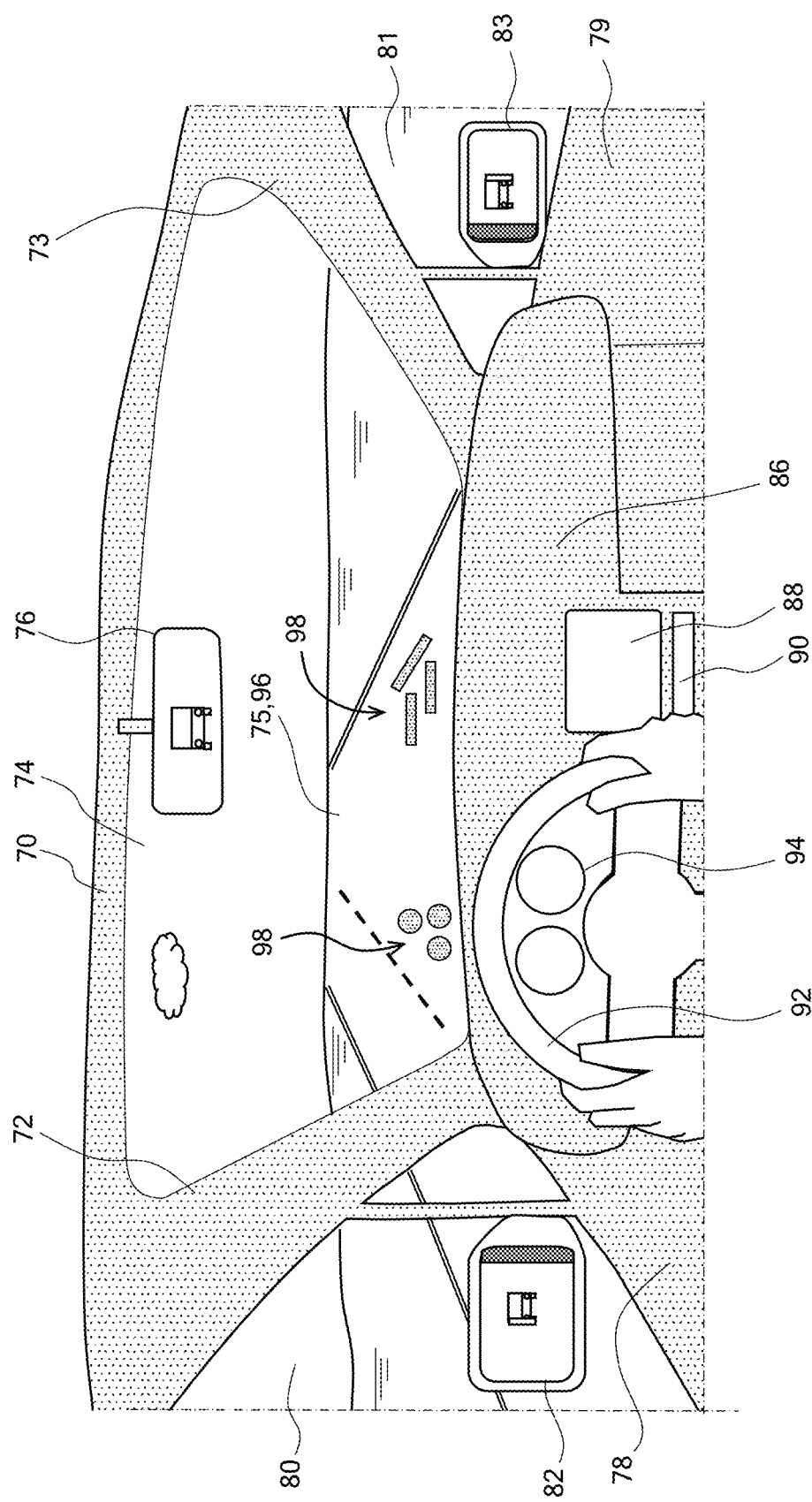
FIG. 4 shows a view seen by the driver wearing the wearable device on which no image is displayed.
Figure 5:
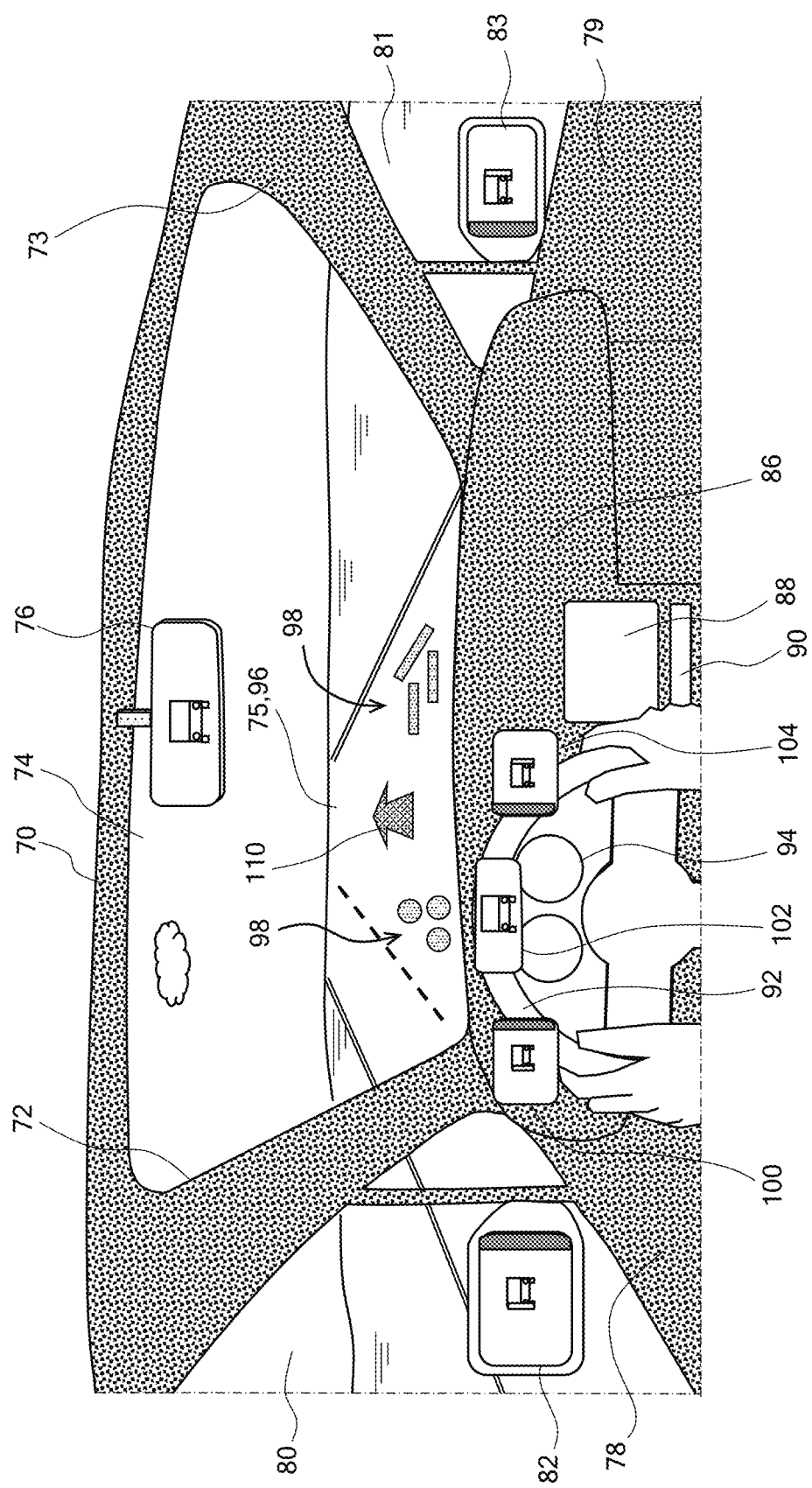
FIG. 5 shows a view seen by the driver wearing the wearable device on which images are additionally displayed.

Next, examples of image representation performed by the wearable device 20 will be explained with reference to FIGS. 4 and 5. FIGS. 4 and 5 are schematic diagrams showing a view seen by the driver 200 wearing the wearable device 20.

FIG. 4 shows a view seen by the driver 200 in a state where the wearable device 20 is not used. In this state, the view seen by the driver 200 is identical to that seen with the naked eyes of the driver 200. In the view of the driver 200, interior components of the vehicle located in front of the driver 200 and a forward landscape outside the vehicle are present.

As the interior components of the vehicle, a roof ceiling 70 in an upper region of the view, and a left A pillar 72 (which is also referred to as a left front pillar) and a right A pillar 73 on the left and right sides of the roof ceiling 70 are contained in the view. In the view, a front wind shield 74 (also referred to as a front glass) is present in a region surrounded by the roof ceiling 70, the left A pillar 72, and the right A pillar 73. The forward landscape outside the vehicle that can be seen through the front wind shield 74 is also contained in the view, the forward landscape which includes, in FIG. 4, a roadway 75 extending forward on a plain. The view also includes, at a position close to a top part of the front wind shield 74, an inner mirror 76 attached to the roof ceiling 70, and the inner mirror 76 reflects a vehicle traveling behind.

In the view, as the interior components, a left front door trim 78 and a right front door trim 79 are present on the left and right sides of the driver 200. Further, a left outer mirror 82 is visible through a left side window glass 80, and a right outer mirror 83 is visible through a right side window glass 81. The left and right outer mirrors 82 and 83 reflect a part of a side surface of the driver 200's own vehicle and a vehicle traveling behind.

An instrument panel 86 of the interior component is present below the wind shield 74 in the view. A touch panel 88 and operation buttons 90 are disposed on the instrument panel 86. The operation input unit 42 of the wearable device 20 worn by the driver 200 is arranged, for example, on the touch panel 88 or the operation buttons 90.

A steering wheel 92 is located before the instrument panel 86 toward the driver 200. In addition, meters 94, such as a speedometer, disposed on the instrument panel 86 are visible within the steering wheel 92 in the view.

An image 98 of the marker 66 (hereinafter, referred to as a marker image 98) that is projected from the marker projector 64 is present on a road surface 96 of the roadway 75 extending ahead of the vehicle. Because the marker image 98 is almost not moved relative to the vehicle in contrast to objects, such as a white line on the road surface 96, being actually located outside the vehicle, a load of computation to extract the marker image 98 is lower than a load of computation to extract feature points of the objects located outside the vehicle. Further, because the road surface 96 of the roadway 75 on which the vehicle is present is, in most cases, on the same plane as the road surface 96 on which the marker image 98 is formed, the position of the marker image 98 is substantially fixed to the vehicle. For this reason, the position and attitude of the wearable device 20 relative to the vehicle can be determined from the position of the marker image 98 as in the case of the position and attitude of the wearable device 20 determined from the position of the interior compartment.

FIG. 5 shows a view seen by the driver 200, in which images formed through operation of the operation input unit 42 by the driver 200 are displayed on the organic EL display 36 of the wearable device 20 so as to be overlaid on the interior components or the forward landscape. In the view of FIG. 5, outer appearances of interior components which are not directly connected to driving operation are modified. Specifically, colors and graphic patterns of the roof ceiling 70, the left and right A pillars 72 and 73, the left and right front door trim 78 and 79, and the instrument panel 86 are modified. The wearable device 20 can modify at least one of properties consisting of colors, graphic patterns, and textures of the interior components using the image data stored in the image data storage 62. Here, the texture denotes a property associated with a material and includes, for example, a metallic texture, a wooden texture, a leather texture, and a padding texture.

In FIG. 5, electronic mirrors are displayed on the organic EL display 36. In the example of FIG. 5, an electronic left outer mirror 100, an electronic inner mirror 102, and an electronic right outer mirror 104 are displayed around an upper part of the steering wheel 92 in that order from the left of the driver 200.

The electronic left outer mirror 100 is an image displayed on the organic EL display 36, the image being obtained by capturing a landscape present behind the vehicle on its left side with the left outer camera 56. On the electronic left outer mirror 100, a part of the side surface of the driver 200's own vehicle is displayed together with the vehicle traveling behind the driver 200's own vehicle as in the case of the left outer mirror 82 which is an optical mirror.

The electronic inner mirror 102 is an image displayed on the organic EL display 36, the image being obtained by capturing a landscape present behind the vehicle with the rear camera 58. On the electronic inner mirror 102, the vehicle traveling behind the driver 200's own vehicle is displayed as in the case of the inner mirror 76.

The electronic right outer mirror 104 is an image displayed on the organic EL display 36, the image being obtained by capturing a landscape present behind the vehicle on its right side with the right outer camera 54. On the electronic right outer mirror 104, a part of the side surface of the driver 200's own vehicle is displayed together with the vehicle traveling behind the driver 200's own vehicle as in the case of the right outer mirror 83.

The electronic left outer mirror 100, the electronic inner mirror 102, and the electronic right outer mirror 104 are displayed on the organic EL display 36 at positions which are viewed by the driver 200 around the upper part of the steering wheel 92 before the steering wheel 92. When the electronic left outer mirror 100, the electronic inner mirror 102, and the electronic right outer mirror 104 are displayed so as to be seen in the upper part of the steering wheel 60, the driver 200 can confirm the outside located behind the vehicle, almost without the need to shift a looking direction from a straight front direction. The electronic left outer mirror 100, the electronic inner mirror 102, and the electronic right outer mirror 104 are arranged at positions which are not overlaid on the forward view seen through the wind shield 74 or the meters 94, to prevent impairment of forward visibility and viewability of the meters 94.

Further, in FIG. 5, a guidance arrow 110 for guiding a route is displayed on the organic EL display 36 so as to be overlaid on the road surface 96 extending ahead of the vehicle. The guidance arrow 110 is displayed based on information from a route guidance device mounted on the vehicle. The guidance arrow 110 shown in FIG. 5 indicates a direction of going straight ahead, while a turning left arrow or a turning right arrow is displayed at an appropriate position in an intersection where operation to turn left or right is required.

In a case where a sufficient amount of light is not obtained, for example, in the nighttime, or in a case where halation is created due to the presence of severe back-light, for example, positions of the interior components and equipment and positions of objects located outside the vehicle may not be properly identified from an image that is captured, for example, in the nighttime or against the sun by the wearable camera implemented as the device position and attitude sensor 30. On the other hand, the marker image 98 which is formed by projecting light can be identified even in a dark environment, such as the nighttime. Because the position of the marker image 98 is substantially fixed to the vehicle as described above, when a relative position of the wearable device 20 with respect to the marker image 98 is found, a relative position of the wearable device 20 with respect to the interior component of the vehicle can be accordingly identified. Therefore, a display position of virtual representation applied to the interior component and the electronic mirror can be determined using the captured image of the marker mage 98. As a result, the virtual representation can be displayed at an appropriate position on the organic EL display 36 even in a case where the amount of light is insufficient or halation is present.

Figure 6:
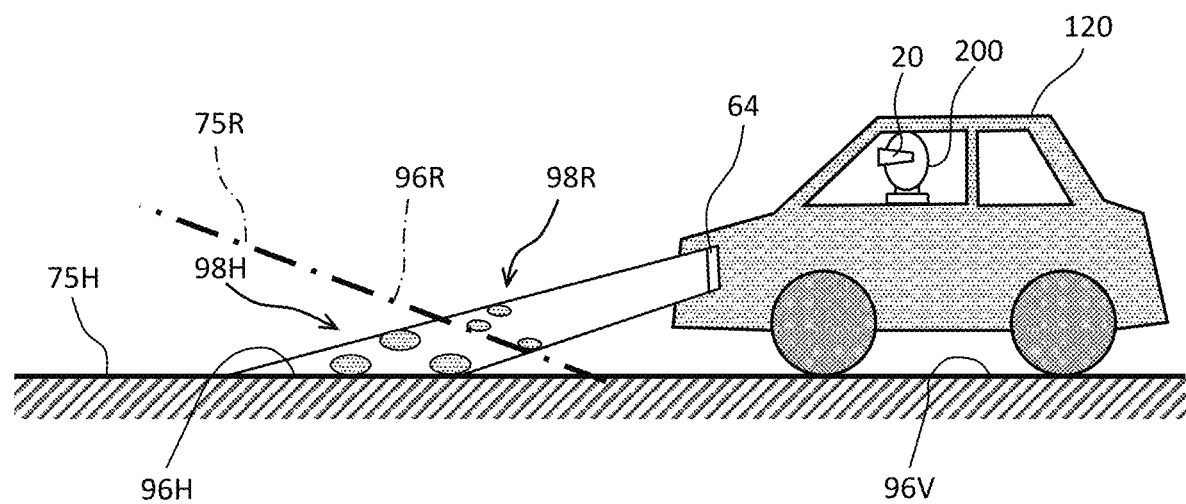
FIG. 6 is a conceptual diagram representing a change in a marker image due to an inclination of a roadway.

FIG. 6 is a conceptual diagram showing a change in position and shape of a marker image caused by an inclined roadway. In FIG. 6, a flat roadway 75H is indicated by a solid line, and an uphill roadway 75R located ahead of the vehicle 120 is indicated by long and short dashed lines. An image of the marker 66A (shown in FIG. 3) that is projected onto a road surface 96H of the flat roadway 75H by the marker projector 64 is shown as a marker image 98H, while an image of the marker 66A projected onto a road surface 96R of the uphill roadway 75R is indicated as a marker image 98R. The road surface 96H is on the same plane as a road surface 96V on which the vehicle 120 is presently located.

Figure 7:
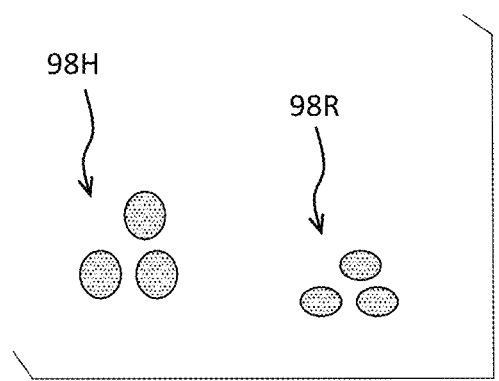
FIG. 7 shows an example of a change in a shape of the marker image due to the inclination of the roadway.

FIG. 7 shows captured images of the marker images 98H and 98R received from the wearable camera implemented as the device position and attitude sensor 30. Because the wearable camera is located at a position higher than the marker projector 64, the captured image of the marker image 98R on the road surface 96R of the uphill roadway 75R is shrunk in the vertical direction and shifted to a position downward of the marker image 97H on the road surface 96H of the flat roadway 75H. Such differences in shape and position between the marker images 98R and 97H in the captured image can be used for determining inclinations of the forward road surfaces 96H and 96R relative to the road surface 96V on which the vehicle 120 is present. Meanwhile, on a downhill roadway, the captured image of the marker image is expanded in the vertical direction and shifted upward.

After the inclination of the forward road surface 96 is acquired, the guidance arrow 110 (see FIG. 5) can be displayed so as to conform to the inclination of the road surface 96. In this way, there can be prevented the situation that a tip end of the guidance arrow 110 is displayed in a manner that the tip end is viewed as sinking beneath the road surface 96 (in a case of the uphill roadway) or floating above the road surface 96 (in a case of the downhill roadway).

Projections and depressions on a road surface, such as speed bumps (a speed reducing zone) for urging drivers to decelerate the vehicle, can be detected based on deformation of the shape of the marker image 98. In the speed bumps having a shape composed of alternating short uphill and downhill roadways, shrinking deformation due to the uphill roadway and expanding deformation due to the downhill roadway are alternatingly detected in succession at a short timer interval while the marker image 98 is moving through the speed reducing zone. In this case, the guidance arrow 110 may be displayed at positions conforming to the shape of the speed bumps, or an indication for urging the driver to decelerate may be displayed on the organic EL display 36.

When the position and attitude of the wearable device 20 is acquired using the marker projected from the driver's own vehicle as described above, accuracy of the display position of the image on the wearable device 20 can be improved even when the external environment is deteriorated in terms of the amount of light, for example, in a dark environment or in an environment with severe back-light.

REFERENCE SIGNS LIST 10 image display system, 20 wearable device, 30 device position and attitude sensor (wearable camera), 32 pupil position sensor, 34 image controller, 36 organic EL display, 40 on-board system, 42 operation input unit, 44 image processor, 45 three-dimensional map generator, 46 device/pupil position calculator, 48 image layout calculator, 50 image composition unit, 62 image data storage, 64 marker projector, 66 marker, 70 roof ceiling, 72 left A pillar, 73 right A pillar, 74 wind shield, 75 roadway, 76 inner mirror, 82 left outer mirror, 83 right outer mirror, 86 instrument panel, 88 touch panel, 90 operation buttons, 92 steering wheel, 94 meters, 96 road surface, 98 marker image, 100 electronic left outer mirror, 102 electronic inner mirror, 105 electronic right outer mirror, 110 guidance arrow, 120 vehicle, 200 driver.

The invention claimed is:

1. An image display system, comprising:
   a wearable device configured to be worn by an occupant of a vehicle, the wearable device comprising a display unit configured to display an image within a view of the occupant and a wearable camera;
   a marker projector mounted on the vehicle and configured to project a marker onto a forward road surface for forming a marker image on the forward road surface;
   a wearable device position and attitude sensor configured to detect a position and an attitude of the wearable device based on the marker image captured by the wearable camera; and
   an image processor configured to determine a position of the image placed within the view of the occupant using the detected position and attitude of the wearable device, and to cause the display unit to display the image at the determined position,
   wherein the wearable device position and attitude sensor is configured to detect inclinations of the wearable device relative to coordinate axes of a coordinate system fixed to the vehicle, as the attitude of the wearable device.

2. The image display system according to claim 1, wherein a shape of the marker is a predetermined two-dimensional figure.

3. The image display system according to claim 2, further comprising a road surface shape detector which is configured to detect at least either an inclination or projections and depressions of the road surface from a position and a geometry of the marker image.

4. The image display system according to claim 1, further comprising a pupil position sensor configured to detect a position of a pupil of the occupant relative to the display unit, wherein the image processor is further configured to use the detected position of the pupil in addition to the detected position and attitude of the wearable device, for determining the position of the image placed within the view of the occupant.

* * * * *